United States Patent
Liang et al.

(10) Patent No.: US 10,059,622 B2
(45) Date of Patent: Aug. 28, 2018

(54) ANTI-REFLECTION GLASS WITH TIN OXIDE NANOPARTICLES

(75) Inventors: Liang Liang, Taylor, MI (US); Richard Blacker, Farmington Hills, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 472 days.

(21) Appl. No.: 13/465,311

(22) Filed: May 7, 2012

(65) Prior Publication Data

US 2013/0295392 A1 Nov. 7, 2013

(51) Int. Cl.
*G02B 1/11* (2015.01)
*C03C 17/00* (2006.01)
*G02B 1/115* (2015.01)

(52) U.S. Cl.
CPC ............ *C03C 17/007* (2013.01); *G02B 1/115* (2013.01); *C03C 2217/211* (2013.01);
(Continued)

(58) Field of Classification Search
CPC ......... G02B 1/11–1/116; C03C 17/002; C03C 17/253; C03C 17/3417; C03C 17/3423
(Continued)

(56) References Cited

U.S. PATENT DOCUMENTS 3,607,322 A 9/1971 Brady et al.
4,510,344 A 4/1985 Berman
(Continued)

FOREIGN PATENT DOCUMENTS

EP 0 702 390 3/1996
EP 0 871 046 10/1998
(Continued)

OTHER PUBLICATIONS

"The Electrical and Optical Properties of Thin Layers of Nano-Sized Antimony Doped Tinoxide Particles"; Van Bommel et al., Journal of Materials Science 34 (1999), pp. 4803-4809.
(Continued)

*Primary Examiner* — Elizabeth A Burkhart
(74) *Attorney, Agent, or Firm* — Dority & Manning, P.A.

(57) ABSTRACT

An improved anti-reflection glass with higher transmittance ($\Delta$Tqe %) results from a coating of or including tin oxide (e.g., $SnO_2$) nanoparticles (e.g., 10-20 nm in size) applied to a surface of solar float or matte/matte glass. The tin oxide based coating layer shows improved chemical stability and durability and can be prepared using a sol-gel process and applied by spin coating. Matte/matte anti-reflection glass samples may have two coating layers (e.g., $SnO_2$ nanoparticles on the rough side and $SiO_2$ nanoparticles on the smooth side) and exhibit an improved transmittance (e.g., visible transmittance) of at least 2.0%, e.g., about 3.5%. As high as a 30% increase of $\Delta$Tqe % has been observed when anti-reflection matte/matte glass coated with $SnO_2$ is exposed in a salt fog chamber for 5 days. The increase in transmittance may be due to the different pore structure of the $SnO_2$ coating layer, while the increase of Tqe % in a salt fog chamber may be due to the crystalline $SnO_2$ formation.

19 Claims, 9 Drawing Sheets

(52) U.S. Cl.
CPC .... *C03C 2217/213* (2013.01); *C03C 2217/42* (2013.01); *C03C 2217/732* (2013.01); *C03C 2217/77* (2013.01); *C03C 2218/113* (2013.01); *C03C 2218/116* (2013.01); *C03C 2218/365* (2013.01)

(58) Field of Classification Search
USPC .................................................. 427/162–169
See application file for complete search history.

(56) References Cited

U.S. PATENT DOCUMENTS

| | | | |
|---|---|---|---|
| 4,806,436 | A | 2/1989 | Tada et al. |
| 4,945,282 | A | 7/1990 | Kawamura et al. |
| 5,091,764 | A | 2/1992 | Asaoka et al. |
| 5,189,337 | A | 2/1993 | Endo et al. |
| 5,742,118 | A | 4/1998 | Endo et al. |
| 5,977,477 | A | 11/1999 | Shiozaki |
| 5,997,943 | A | 12/1999 | Azzopardi et al. |
| 6,190,776 | B1 | 2/2001 | Demiryont |
| 6,312,808 | B1 | 11/2001 | Veerasamy et al. |
| 6,350,397 | B1 | 2/2002 | Heikkila et al. |
| 6,506,622 | B1 | 1/2003 | Shiozaki |
| 6,610,622 | B1 | 8/2003 | Landa et al. |
| 6,706,398 | B1 | 3/2004 | Revis |
| 7,128,966 | B2 | 10/2006 | Hattori |
| 7,598,595 | B2 | 10/2009 | Chao et al. |
| 7,700,870 | B2 | 4/2010 | Thomsen et al. |
| 7,767,253 | B2 | 8/2010 | Sharma |
| 7,893,350 | B2 | 2/2011 | Thomsen et al. |
| 8,053,070 | B2 | 11/2011 | Lee et al. |
| 8,157,907 | B2 | 4/2012 | Chiang et al. |
| 8,294,139 | B2 | 10/2012 | Marsh et al. |
| 2002/0014090 | A1 | 2/2002 | Tsujino et al. |
| 2002/0192380 | A1 | 12/2002 | Elsbernd et al. |
| 2003/0180544 | A1 | 9/2003 | Murphy |
| 2004/0028819 | A1* | 2/2004 | Park et al. .................. 427/372.2 |
| 2004/0156984 | A1* | 8/2004 | Vitt ..................... C03C 17/3417 427/162 |
| 2005/0142710 | A1 | 6/2005 | Suzuki |
| 2006/0115654 | A1* | 6/2006 | Thomsen ............ C03C 17/3417 428/432 |
| 2006/0154044 | A1 | 7/2006 | Yamada et al. |
| 2007/0074757 | A1 | 4/2007 | Mellott et al. |
| 2009/0101209 | A1 | 4/2009 | Sharma et al. |
| 2009/0169859 | A1 | 7/2009 | Biteau et al. |
| 2009/0169870 | A1 | 7/2009 | Zheng |
| 2009/0220774 | A1 | 9/2009 | Imai et al. |
| 2010/0025638 | A1 | 2/2010 | Murota et al. |
| 2010/0101649 | A1 | 4/2010 | Huignard et al. |
| 2010/0208350 | A1* | 8/2010 | Yoshihara ..................... 359/585 |
| 2011/0073174 | A1* | 3/2011 | Varaprasad ................... 136/256 |
| 2011/0151222 | A1 | 6/2011 | Oudard et al. |
| 2012/0237676 | A1 | 9/2012 | Kalyankar et al. |

FOREIGN PATENT DOCUMENTS

| | | |
|---|---|---|
| EP | 1 167 313 | 1/2002 |
| EP | 2 463 236 | 6/2012 |
| JP | 62-289801 | 12/1987 |
| JP | 07-122764 | 5/1995 |
| WO | WO 95/13993 | 5/1995 |
| WO | WO 97/15935 | 5/1997 |
| WO | WO 99/37720 | 7/1999 |
| WO | WO 00/10934 | 3/2000 |
| WO | WO 2007/088312 | 8/2007 |
| WO | WO 2010/079495 | 7/2010 |
| WO | WO 2010/106326 | 9/2010 |
| WO | WO 2012/150410 | 11/2012 |

OTHER PUBLICATIONS

U.S. Appl. No. 13/361,754, filed Jan. 30, 2012; Lewis et al.
U.S. Appl. No. 13/360,898, filed Jan. 30, 3012; Lewis et al.
EP Search Report dated Jun. 3, 2014 for EP 13196999.0.
EP Search Report dated Jun. 3, 2014 for EP 13196930.5.
U.S. Appl. No. 13/485,047, filed May 31, 2012; Liang et al.
U.S. Appl. No. 13/713,882, filed Dec. 13, 2012; Liang et al.
U.S. Appl. No. 13/713,811, filed Dec. 13, 2012; Liang et al.
U.S. Appl. No. 13/713,990, filed Dec. 13, 2012, Liang et al.

* cited by examiner

ANTI-REFLECTION GLASS WITH TIN OXIDE NANOPARTICLES

Certain example embodiments of this invention relate to anti-reflection (AR) glass products and a method of manufacturing anti-reflection glass products that include at least a coating layer containing tin oxide (e.g., $SnO_2$) nanoparticles. In exemplary embodiments, the coating layer is applied to solar float or matte/matte glass products and results in increased visible transmittance of the anti-reflection glass, improved resistance of the coating layer in salt fog chamber tests, and/or better chemical stability and durability of the glass coating over time.

As detailed below, a sol-gel process may be used to prepare coating formulations containing $SnO_2$ nanoparticles which are then applied to the glass substrate using a spin coating process to produce an improved anti-reflection end product. The term "sol-gel process" as used herein means a process wherein a wet formulation (referred to generally as a "sol") having both liquid and solid characteristics is applied to the glass substrate in the form of a thin gel coating and then heat treated to form the final solid coating. The sol-gel process described herein results in highly uniform compositions containing tin oxide nanoparticles that can be applied to glass substrates to form coatings with very precise thicknesses.

BACKGROUND AND SUMMARY OF EXAMPLE EMBODIMENTS

Existing anti-reflection glasses are known to exhibit a lower level of transmittance after being stored in a salt fog chamber for extended periods of time (e.g., five days at 35° C., 5% NaCl and a pH of between 6.5 and 7.2). It is also known that anti-reflection glass products can eventually fail during such tests due to the presence of partial or whole pealed films that have a lower resistance to sodium hydroxide (NaOH), particularly under conditions of high moisture and elevated temperatures over extended periods of time.

It has now been found that the durability and transmittance of anti-reflection glass can be significantly improved (even during extended salt fog chamber tests) by introducing tin oxide (e.g., $SnO_2$) nanoparticles (e.g., 10-20 nm in size) which have more stable chemical properties into the coating formulation for the anti-reflection glass. $SnO_2$ is an n-type semiconductor with a wide band gap, e.g., 3.6 eV at 300° K, and thus possesses unique optical and electrical properties, including variable receptivity in gaseous environments, high optical transparency in the visible range (up to 97%), low resistivity (4 to 106 $\Omega cm^{-1}$) and excellent chemical stability.

In certain example embodiments of this invention, there is provided a method of forming a coated article comprising an anti-reflection coating on a glass substrate to increase transmittance, the method comprising: providing a colloidal solution comprising tin oxide based nanoparticles; depositing at least a portion of said colloidal solution comprising tin oxide based nanoparticles on a glass substrate to form a substantially uniform coating; curing said coating at least by heating said glass substrate and said coating.

It has been found that matte/matte anti-reflection glass products having two different coating layers (e.g., $SnO_2$ nanoparticles on the "rough" side and silica ($SiO_2$) nanoparticles on the "smooth side") show and increase in transmittance ($\Delta Tqe$ %) of the anti-reflection glass of at least about 2%, more preferably at least about 3.5%. The observed increase of Tqe % using $SnO_2$ nanoparticles is believed to be the result of a different pore structure in the final coating. As high as a 30% increase in Tqe % has also been observed for anti-reflection matte/matte glass coated with $SnO_2$ nanoparticles after being exposed in a salt fog chamber for a period of 5 days. Those improved results during a salt fog test may be due to the formation of a more crystalline form of $SnO_2$ in the film.

DETAILED DESCRIPTION OF THE INVENTION

Figure 1:
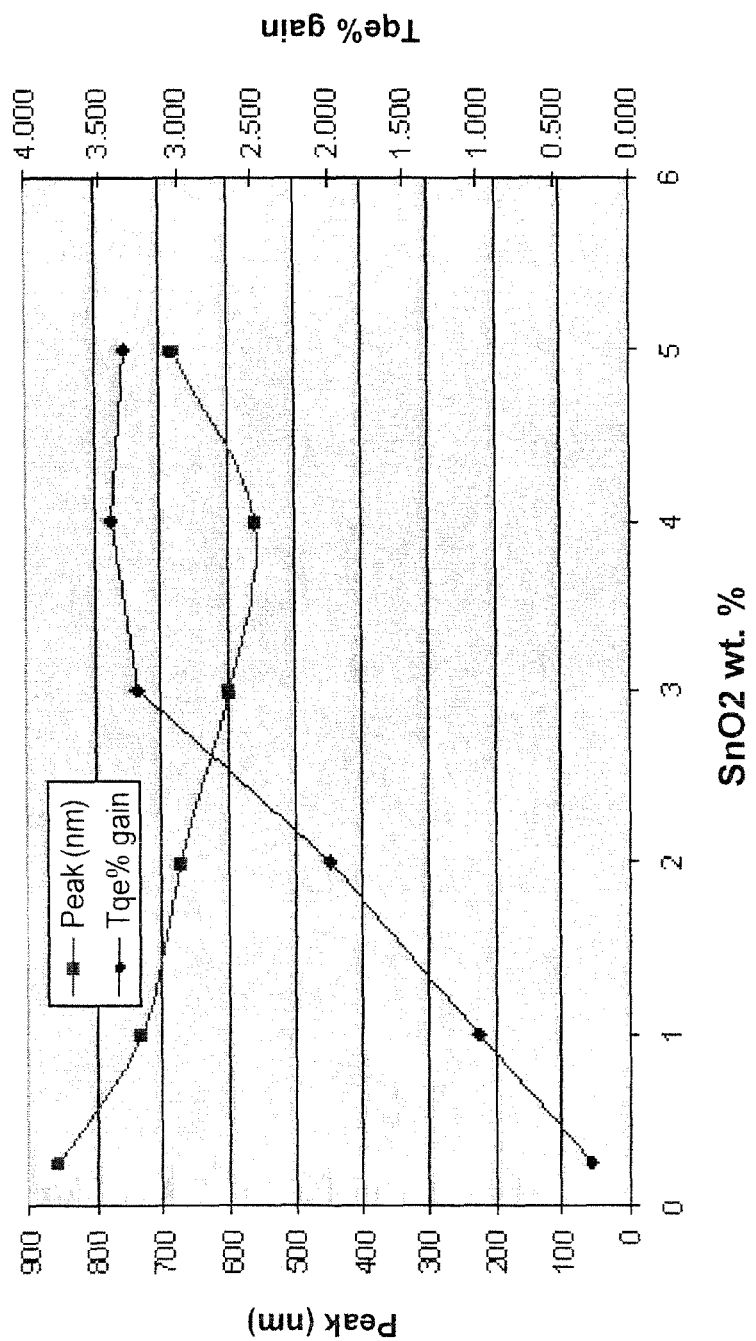
FIG. 1 is a graph illustrating the increase (identified as a "% gain") in glass transmittance ($\Delta Tqe$ %) resulting from different $SnO_2$ coating layers applied to the rough side of anti-reflection matte/matte glass and $SiO_2$ layers (3% by wt.) applied to the smooth side.

An improved anti-reflection glass with higher transmittance has been developed by applying a thin film containing tin oxide based (e.g., $SnO_2$ based) nanoparticles to solar float and matte/matte glass products. In particular, it has been found that the refractive index of anti-reflection thin films containing $SnO_2$ nanoparticles reduces the reflection of incident light and increases the transmittance of the glass. The thin film itself, i.e., the final glass coating, also shows improved chemical stability and durability over time. In exemplary embodiments, the refractive index and thickness of anti-reflection films containing $SnO_2$ nanoparticles range from about 1.42 to 1.445 nm and 20-100 nm, respectively, with the amount of $SnO_2$ present in the colloidal solution ranging from 2-5% by weight. The roughness of the $SnO_2$ thin film decreases if higher amounts of $SnO_2$ nanoparticles are applied to the glass surface. The decrease in roughness may be attributable to a more dense structure of thin films containing $SnO_2$ after being applied to the glass and then cured.

In certain example embodiments of this invention, there is provided a method of forming an anti-reflection coating on (directly or indirectly) a glass substrate to increase transmittance (e.g., visible transmittance), the method comprising: providing a colloidal solution of or including $SnO_2$ nanoparticles; depositing at least a portion of said colloidal solution comprising $SnO_2$ nanoparticles onto (directly or indirectly) at least one surface of a glass substrate to form a substantially uniform coating; curing said coating by heating said glass substrate and said coating to an elevated temperature(s).

As discussed below, the crystal structure of the $SnO_2$ thin film coatings on solar float glass when measured by X-ray diffraction indicates that an imperfect crystalline structure may exist in the $SnO_2$ film because of slightly weaker peaks appearing in the diffraction spectrum. The lattice constants also differ from a standard tetragonal rutile structure. Regardless, exemplary solar float and matte matte anti-reflection glass products coated by $SnO_2$ nanoparticle thin films pass both water boil and NaOH tests.

It has also been found that anti-reflection thin films containing $SnO_2$ nanoparticles, but without any binder being added, exhibit a lower crosslinking density in the network at the interface of the glass and nanoparticles. (A similar phenomenon has been observed in anti-reflection thin films made with silica nanoparticles). The mechanical strength of the $SnO_2$ thin films according to the invention has thus been improved by including binders with the $SnO_2$ nanoparticles in the final coating.

With the above background in mind, the following examples and test results illustrate exemplary anti-reflection glass products having coatings containing different amounts of $SnO_2$ nanoparticles.

Initial Test Materials

The following raw materials were used to form samples with the new $SnO_2$ coatings: Tin (IV) oxide amorphous solution (50% in methanol), n-propyl alcohol, acetic acid (AcOH), tetraethyl orthosilicate, deionized water, nitrogen, solar float glass, matte/matte glass, and silica ($SiO_2$) nanoparticles (without purification).

Preparation of Exemplary Colloidal Solutions Containing $SnO_2$

Different amounts of Tin (IV) oxide amorphous solutions were placed into a glass jar (100 ml) and diluted with n-propyl alcohol to obtain a sol-gel containing $SnO_2$ nanoparticles (10-20 nm in size). The solutions were then used immediately without aging.

Preparation of Colloidal Solutions with $SiO_2$

A colloidal solution (referred to herein as a "Gen. 1.5 sol") with elongated $SiO_2$ nanoparticles and tetraethyl orthosilicate as a binder was prepared using the formulation in Table 1 below. The procedure included the following steps: 69.714 g of n-propyl alcohol was placed into 200 ml of glass bottle with a Teflon stirring bar. Thereafter, 1.808 g of water, 3.637 g of tetraethyl orthosilicate and 19,951 g of nano silica ($SiO_2$) particles were added, in that order. The solution was stirred after adding 4.89 g of AcOH and appeared cloudy, but no visible particles or precipitation was observed after aging 3 months.

TABLE 1

Formulation of Gen 1.5 Sol ($SiO_2$ Colloidal Solution)

| Chemicals | M.W. (g/mol) | Wt % | Mol ratio |
|---|---|---|---|
| n-propyl alcohol | 60.1 | 69.714 | 1.000 |
| Deionized water | 18 | 1.808 | 0.070 |
| Acetic acid (AcOH) | 60.05 | 4.890 | 0.056 |
| Tetraethyl orthosilicate (TEOS) | 208.33 | 3.637 | 0.012 |
| Silica nanoparticles | N/A | 19.951 | — |
| Total | — | 100 | — |

In the above formula for Gen 1.5 sol, the silica nanoparticles include about 15 wt. % amorphous silica, 85 wt. % isopropanol and less than about 1 wt. % water. If elongated silica particles are used, they can range in diameter between 9-15 nm with an average length of 40-100 nm and with the OH group present in an amount of about 5-8 OH/nm2. Water-based silica nanoparticles, such as SNOWTEX™ from Nissan Chemical, can also be used, with the size of silica nanoparticles ranging from 10-100 nm at a weight percentage of 20-40%.

In addition to elongated silica nanoparticles, spherical silica nanoparticles, such as those produced under the trade name ORGANOSILICASOL™ (Nissan Chemical), can be used having a particle size of between 9-15/40-100 nm, a wt % $SiO_2$ of 15-16%, less than 1% water, a viscosity of less than 20 mPa·s. and a specific gravity of between 0.85 and 0.90. The weight percentage of spherical silica nanoparticles in solution typically ranges from 20-40%, which corresponds to 60-80% of solvent in the silica solution. Minor amounts of water in the range from 0.3 to 3 wt. % may also be present in the final solution.

For Gen 1.5 sols such as those in Table 1, the amount of solid SiO2 typically is about 4 wt. %. However, the solid percentage can be from 0.6-10 wt. %, with the amount of solvent comprising 70-97 wt. %. The amount of tetraethyl orthosilicate (TEOS) used as a binder ranges from 0.3 to 20 mol. %; the amount of acetic acid (which serves as a catalyst) ranges from 0.01-7 mol. %; and the molar ratio of water to silica ranges from 1.1 to 50.

A typical solvent used in the silica solution includes alcohol, such as isopropanol, methanol and ethanol. However, other useful solvents include N,N-dimethyl acetamide, ethylene glycol, ethylene glycol mono-n-propyl ether, methyl ethyl ketone and methyl isobutyl ketone. Isopropanol is the recommended solvent for silica nanoparticles ranging in size from 10 to 100 nm.

Preparation of Anti-Reflection Glass Coated with $SnO_2$ and $SiO_2$ Sols

Matte/matte or solar float glass (3"×3") was washed by a detergent, rinsed with deionized water and dried using nitrogen gas. The glass was then mounted on the sample stage of a spin coater with vacuum. The spin speed was set to 1500 rpm and the ramp at 255 rps, respectively. One milliliter (ml) each of colloidal solutions containing $SnO_2$ nanoparticles (10-20 nm in size) and $SiO_2$ were coated onto the rough and smooth surfaces, respectively, of the glass using a pipette followed by a spin time of 30 seconds. The coated glass samples were then cured in an oven with 650° C. for 3.5 min and tested with the results as noted below.

1. Atomic Force Morphology Test

The surface topography the anti-reflection glass was investigated using an atomic force microscope. A 1 cm×1 cm anti-reflection glass sample was mounted on the sample stage with a scanning area of 20 μM×20 μm and scanning rate of 0.3. The sample roughness was then quantitatively determined as a root mean square roughness ($R_m$) using Equation (1) below:

$$R_m = \sqrt{\frac{1}{n}\sum_{i=1}^{n} y_i^2} \quad (1)$$

where $y_i$ is the height of the peak in an atomic force morphology image.

2. Ellipsometer Test

The optic thickness and refractive index of an anti-reflection glass sample were measured by an Ellipsometer with multiple angles used to scan the sample and measure the complex reflectance ratio, ρ, which is parameterized by Ψ and Δ. The refractive index of the anti-reflection glass was then recorded at a wavelength of 550 nm.

3. X-Ray Diffraction Test

The crystalline phases of glass samples were identified using X-ray diffraction measurements by a 2θ/θ model using an X-ray diffractometer with the CuKα radiation operated at 40 kV and 40 mV.

4. UV-Vis Spectroscopy Test

The transmittance Tqe % of raw and anti-reflection glass was measured by UV-Vis spectroscopy from 400 to 1200 nm, with the average Tqe % calculated using Equation (2) below:

$$Tqe\% = \frac{\sum_{i=400}^{1200} (Tqe\%)_i}{\sum_{i=400}^{1200} N_i} \quad (2)$$

The increase in transmittance, ΔTqe %, was then calculated by subtracting the Tqe % of raw glass from Tqe % of anti-reflection glass using Equation (3) below:

$$\Delta Tqe\% = (Tqe\%)_{AR} - (Tqe\%)_{raw} \quad (3)$$

Durability Tests

The following durability tests were conducted on exemplary anti-reflection glass samples, including those coated with $SnO_2$ and $SiO_2$.

1. Water Boil Procedure

The anti-reflection glass is immersed in a beaker filled with deionized water at 100° C. After 10 min, the anti-reflection glass is removed from the boiling water and dried by $N_2$ gas before conducting a UV-vis measurement. The resulting change in Tqe % of the glass is calculated as the difference of Tqe % before and after the water boil test, with an error specification for the test of ±0.5%.

2. NaOH Solution Test

Anti-reflection glass is placed in a beaker filled with NaOH solution (0.1N) at room temperature. After 1 hour, the glass is removed from the solution, washed with deionized water and dried by $N_2$ gas. The change in Tqe % is then measured as the difference of Tqe % before and after the NaOH test, again with an error specification of ±0.5%.

3. Tape Pull Test

A tape (for example, 3M type 3179C) is placed on the surface of anti-reflection glass coated with $SnO_2$ using finger pressure on the tape. After 1.5 minutes, the tape is pulled out quickly by hand and the residual adhesive on the tape removed with tissue paper soaked with isopropyl alcohol. The change in Tqe % of the anti-reflection glass is then determined by the difference of Tqe % before and after the tape pull test, with an error specification of ±1.5%.

4. Crockmeter Test

A Crockmeter test is preformed using an Atlas CM-5 crockmeter. The size of the glass sample is 3"×3" and the total test cycle is 500 for a side coated with $SnO_2$ or $SiO_2$.

5. Salt Fog Test

A salt fog test solution is prepared having 5% NaCl and a pH in the range of 6.5-7.2, adjusted by a NaOH solution. The salt fog chamber temperature is set at 35° C. The test glass is then washed with deionized water and dried by $N_2$ gas before any further testing.

The above tests were performed on glass samples coated with $SnO_2$ and/or $SiO_2$ nanoparticles as described above with the following results.

Effect of the $SnO_2$ Coating Layer on Tqe % of Anti-Reflection Glass

Figure 2:
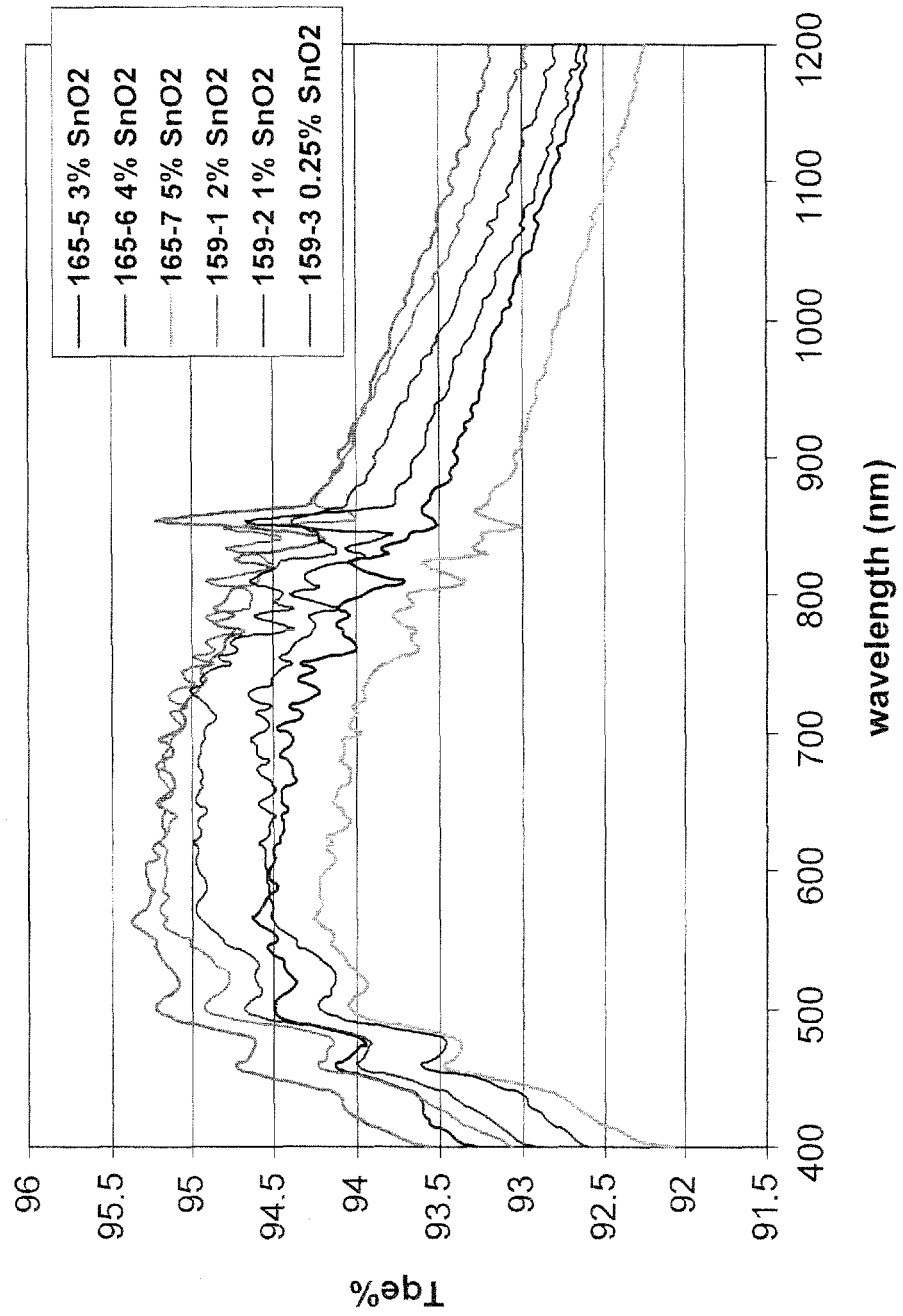
FIG. 2 is a graph showing the percentage increase in transmittance at different wavelengths (expressed in nm) for anti-reflection matte/matte glass products coated with varying amounts of $SnO_2$ (expressed in wt. %) applied to the rough side and $SiO_2$ (3%) applied to the smooth side.

The effect of $SnO_2$ on ΔTqe % of matte/matte anti-reflection glass can be seen from FIGS. 1 and 2. An unexpected rapid increase of ΔTqe % was observed when only a slight amount of $SnO_2$ was coated on the rough side of matte/matte glass. The ΔTqe % of the glass remained almost unchanged as the percentage of $SnO_2$ in the colloidal solution approached 3% by wt. FIG. 2 shows the curve of Tqe % vs. wavelength and reflects the typical shape of the plot for anti-reflection glass, with the highest peak wavelength around 600 to 700 nm.

The unexpected increase of Tqe % for matte/matte anti-reflection glass coated with $SnO_2$ was confirmed in subsequent tests. Eight matte/matte anti-reflection glasses were made under the same conditions. The resulting ΔTqe %, along with corresponding peak wavelength numbers, is summarized in Table 2 below. The ΔTqe % of matte/matte anti-reflection glass is close to 3.718% with a standard error range of 0.067.

Figure 3:
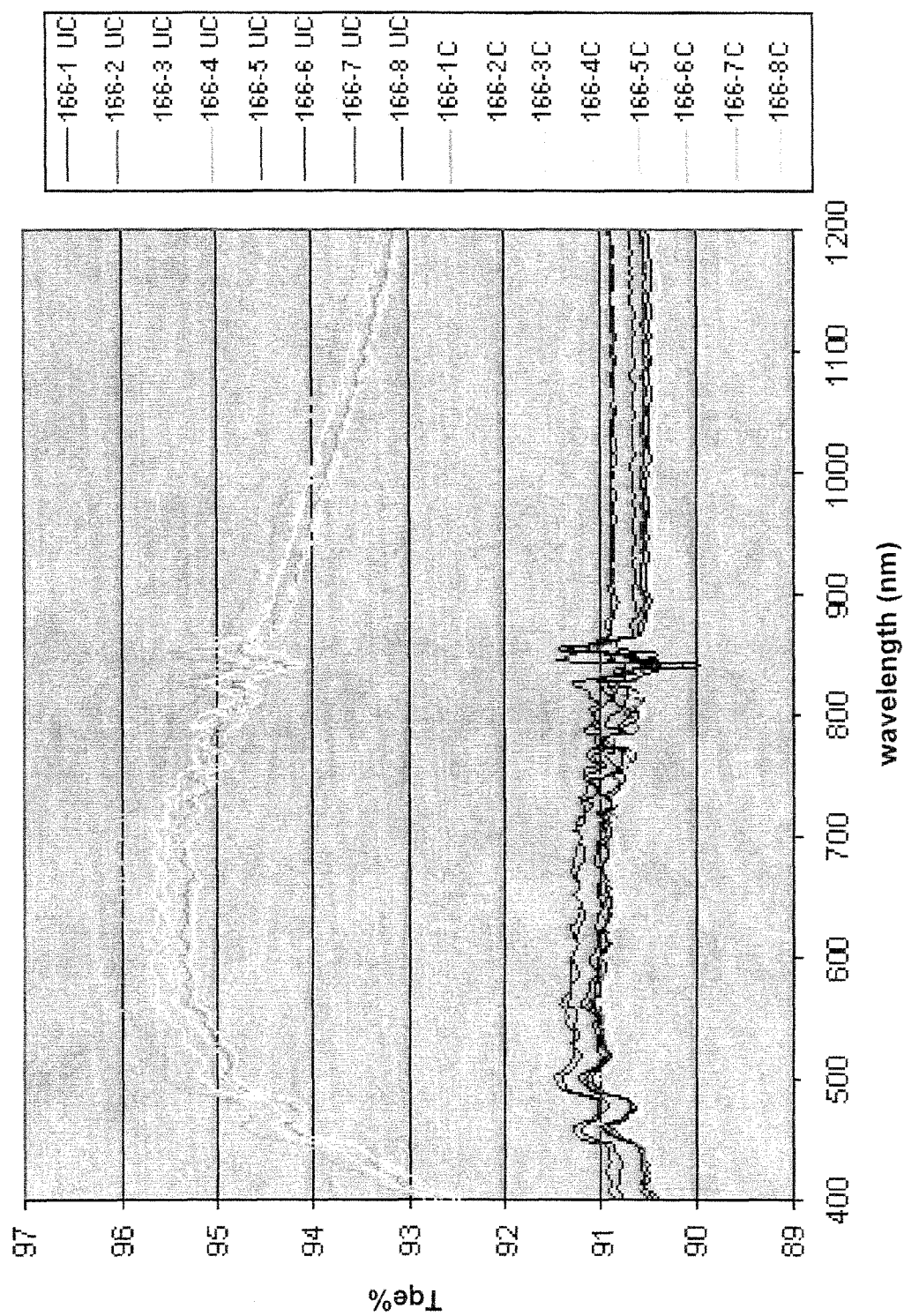
FIG. 3 is a graph depicting the relative change in transmittance at different wavelengths for different matte/matte glass samples coated with $SnO_2$ (4 wt. %) on the rough side and $SiO_2$ (3%) on the smooth side.

FIG. 3 shows the curves of Tqe % of matte/matte anti-reflection glass compared to uncoated matte/matte glass based on the tests summarized in Table 2.

TABLE 2

Repeated Tests of Matte/Matte Anti-reflection Glass Made with a Coating Layer of $SnO_2$ and $SiO_2$ Nanoparticles

| ID | Tqe % uncoated | Tqe % coated | Peak (nm) | ΔTqe % |
|---|---|---|---|---|
| 166-1 UC | 90.688 | 94.362 | 600 | 3.675 |
| 166-2 UC | 90.726 | 94.463 | 600 | 3.737 |
| 166-3 UC | 90.607 | 94.278 | 695 | 3.671 |
| 166-4 UC | 90.818 | 94.568 | 600 | 3.750 |
| 166-5 UC | 91.002 | 94.826 | 695 | 3.824 |

TABLE 2-continued

Repeated Tests of Matte/Matte Anti-reflection Glass Made with a Coating Layer of $SnO_2$ and $SiO_2$ Nanoparticles

| ID | Tqe % uncoated | Tqe % coated | Peak (nm) | ΔTqe % |
|---|---|---|---|---|
| 166-6 UC | 90.808 | 94.457 | 660 | 3.649 |
| 166-7 UC | 91.057 | 94.850 | 600 | 3.792 |
| 166-8 UC | 90.721 | 94.369 | 690 | 3.648 |
| Ave | 90.803 | 94.522 | 643 | 3.718 |
| STD | 0.155 | 0.213 | 47 | 0.067 |

In order to explore the reason for the unexpected increase of Tqe % for anti-reflection glass coated with $SnO_2$, a comparison was made of the of ΔTqe % for solar float anti-reflection glass made with a single coating of $SnO_2$ nanoparticles and glass having a double coating of $SnO_2$ and $SiO_2$ nanoparticles. Two different anti-reflection glasses were prepared, tested and analyzed as summarized below. One sample consisted of a solar float anti-reflection glass coated on the air side with a colloidal solution having different $SnO_2$ amounts. Another sample consisted of a solar float anti-reflection glass coated on the air side with $SnO_2$ nanoparticles and $SiO_2$ nanoparticles on the opposite side.

Figure 4:
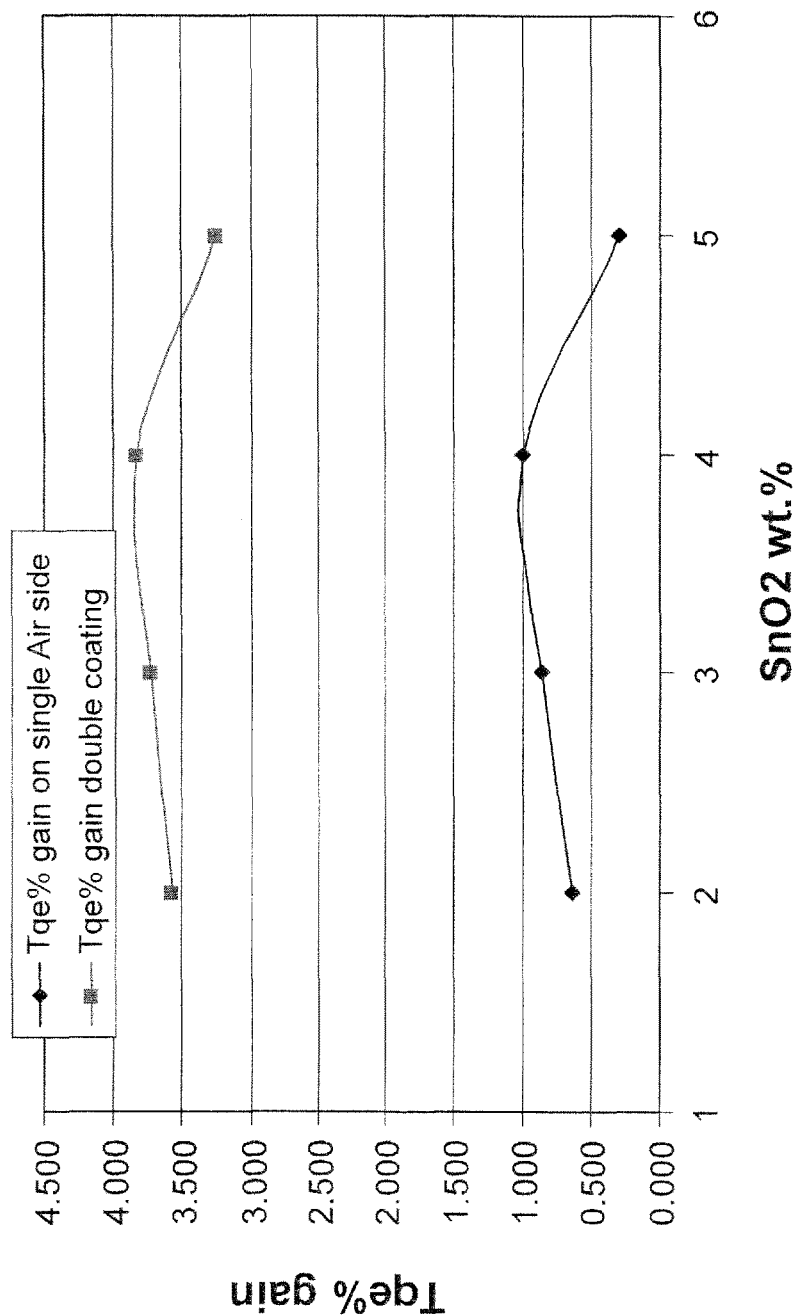
FIG. 4 is a graph showing the effect on transmittance of anti-reflection glass using different amounts of $SnO_2$ (in wt. %) when the $SnO_2$ is applied as either a single coating on the air side or as a double coating.

FIG. 4 shows the change of ΔTqe % for different amounts of $SnO_2$ (in wt. %) in the colloidal solution. An increase of ΔTqe % can be seen with increasing amounts of $SnO_2$ on the coated anti-reflection glass. The increase of ΔTqe % is attributed to the increase in thickness of one side of the anti-reflection glass with $SnO_2$ and resulting different refractive index. On the other hand, a decrease of ΔTqe % was observed with anti-reflection glass coated with higher amounts of $SnO_9$ (at or above 5% by wt.).

Figure 5:
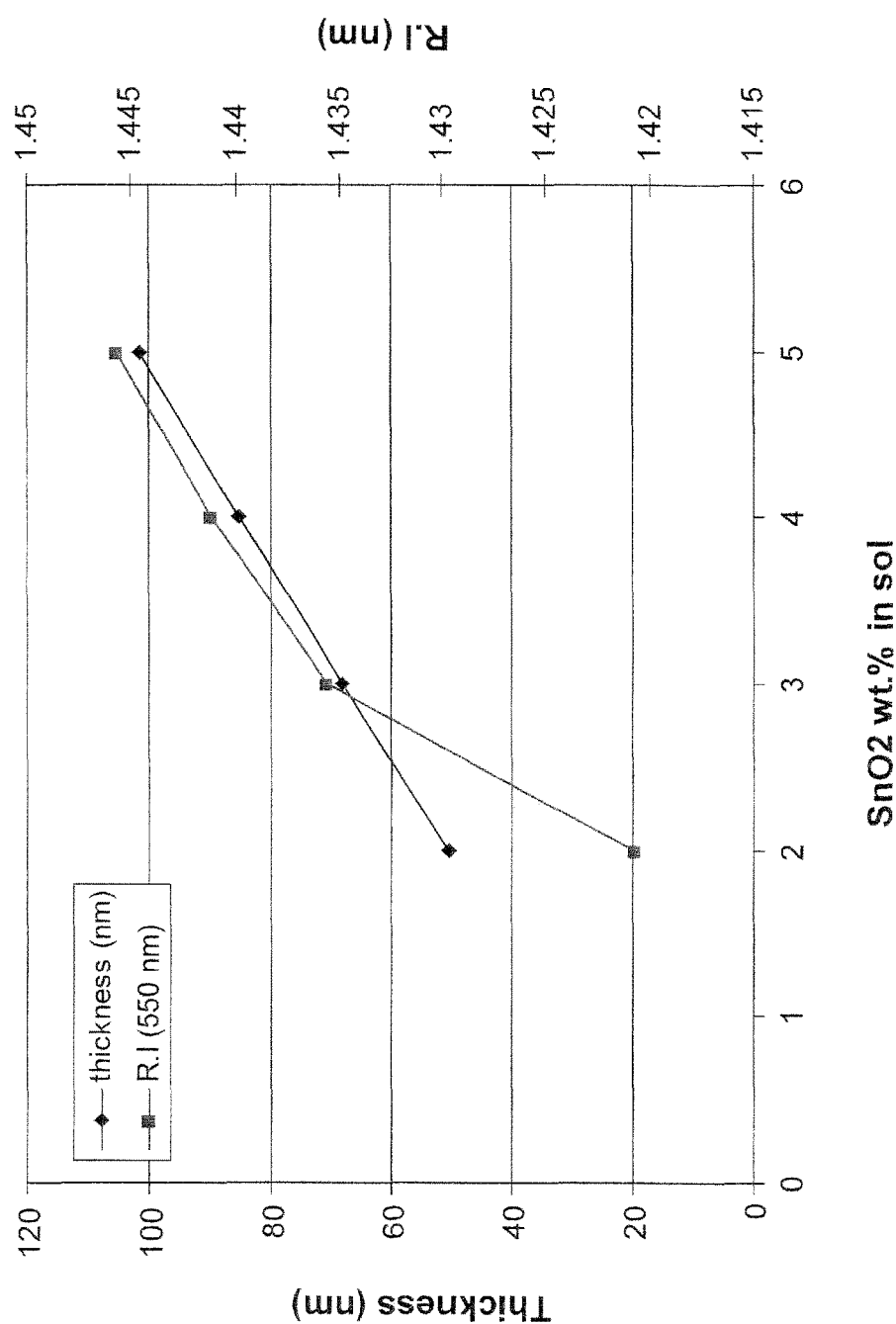
FIG. 5 is a graph illustrating the change in refractive index of the $SnO_2$ when applied at different thickness levels on solar float glass (air side)

FIG. 5 shows the thickness and refractive index of solar float anti-reflection glass coated with a single coating of $SnO_2$. Both the thickness and refractive index increased with an increase of the $SnO_2$ amount. The increase of thickness is attributed to the more spherical $SnO_2$ particles as applied to the surface of the anti-reflection glass. The pore structure and refractive index are also believed to be less for the $SnO_2$ coating layer as compared to $SnO_2$ alone (1.99).

Topography of the $SnO_2$ Coating Layer

Figure 6:
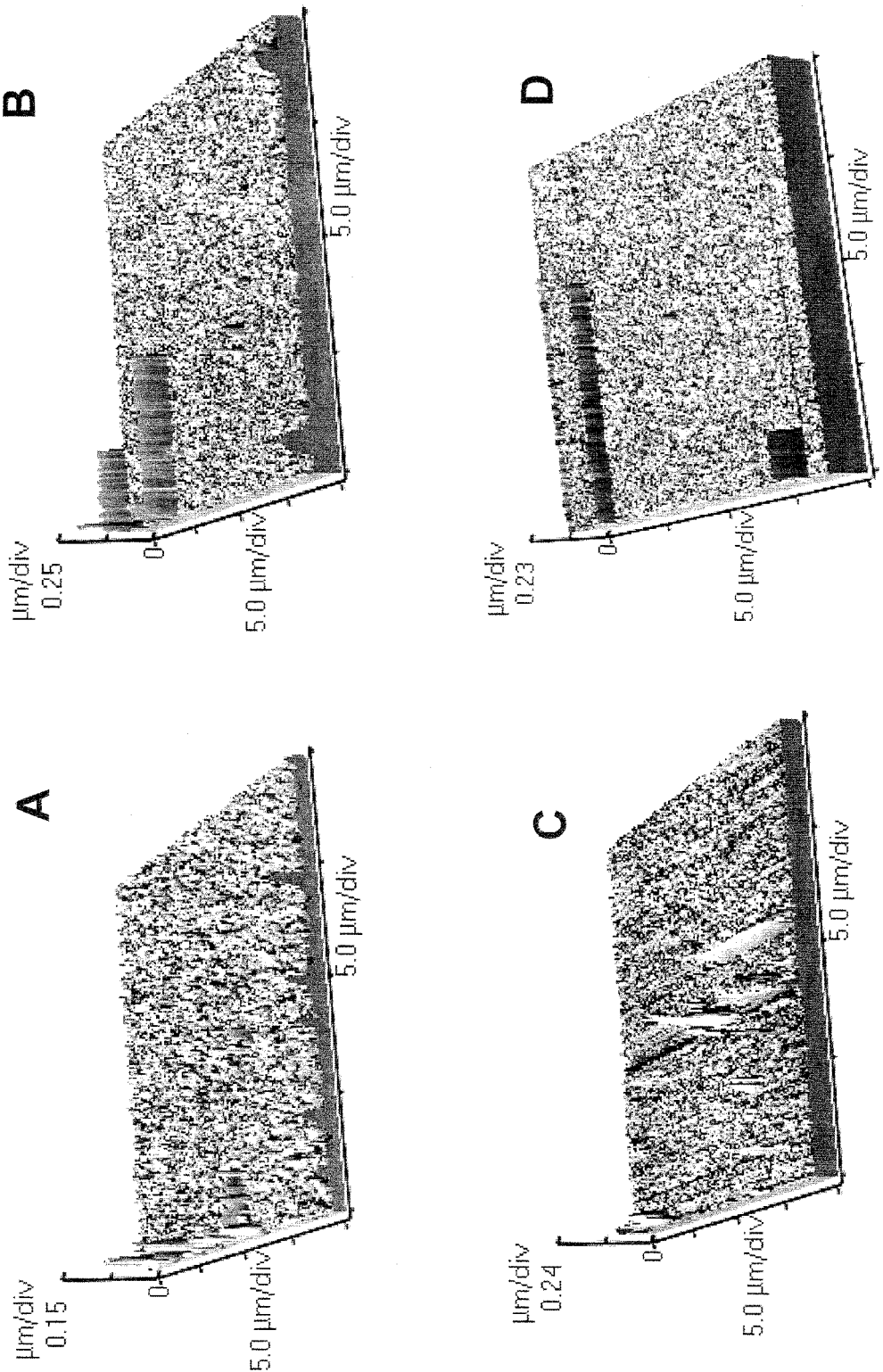
FIG. 6 is a set of three dimensional images of exemplary anti-reflection solar float glass products coated with $SnO_2$ (air side) according to the invention.
Figure 7:
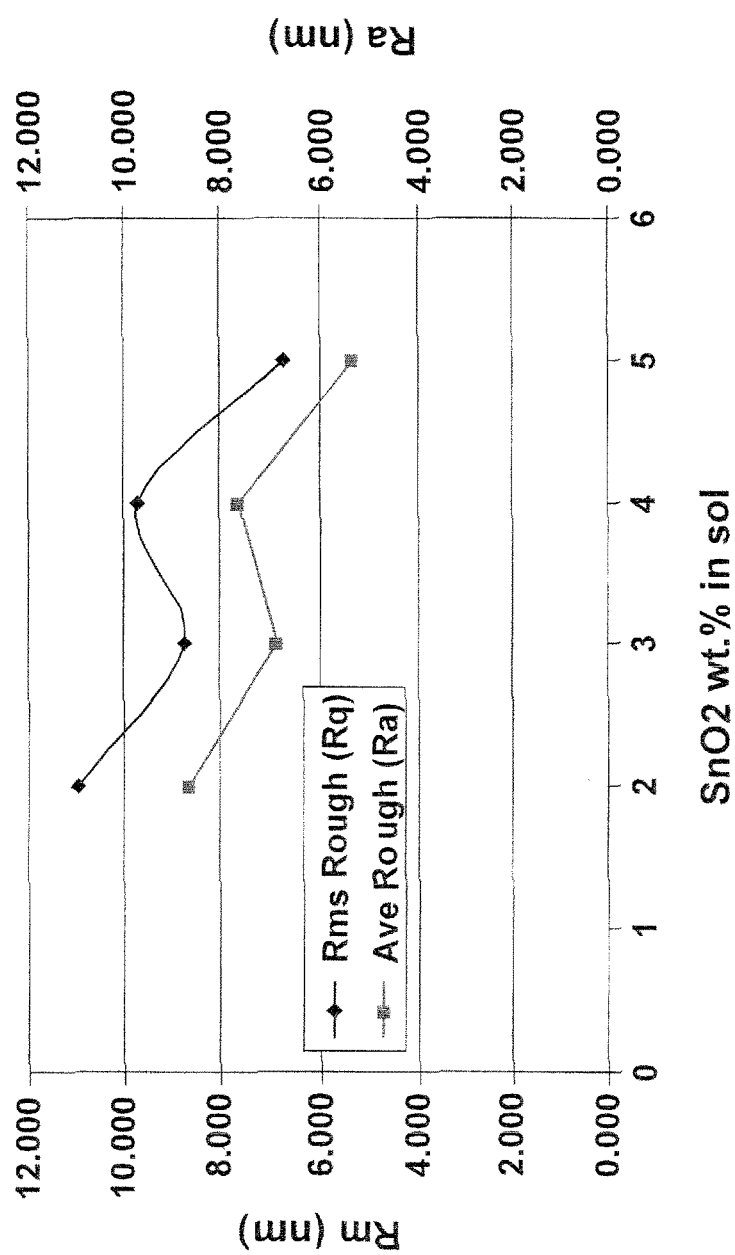
FIG. 7 is a graph showing the effect of different amounts of $SnO_2$ on the level of roughness of coated anti-reflection glass surfaces.

FIG. 6 shows various images of exemplary anti-reflection glass samples coated with $SnO_2$ in the above manner. FIG. 6 also indicates that the roughness of the anti-reflection surface decreases with increasing amounts of $SnO_2$ on the coated surface. See also FIG. 7.

Table 3 below includes the statistical data for the roughness of the surface for glass coated with $SnO_2$ on the air side as represented by $R_m$, which decreases with higher amounts of $SnO_2$ coated on the glass surface. With increasing amounts of $SnO_2$ present in the colloidal solution, more spherical $SnO_2$ particles may be packed tightly together on the glass surface, which serves to reduce the roughness of the coating layer.

TABLE 3

Roughness of Solar Float Anti-Reflection Glass Coated with $SnO_2$ on the Air Side

| $SnO_2$ wt. % | $R_m$ | $R_a$ |
|---|---|---|
| 2 | 10.943 | 8.623 |
| 3 | 8.700 | 6.863 |
| 4 | 9.680 | 7.624 |
| 5 | 6.733 | 5.334 |

X-Ray Diffraction of the $SnO_2$ Coating Layer

Figure 8:
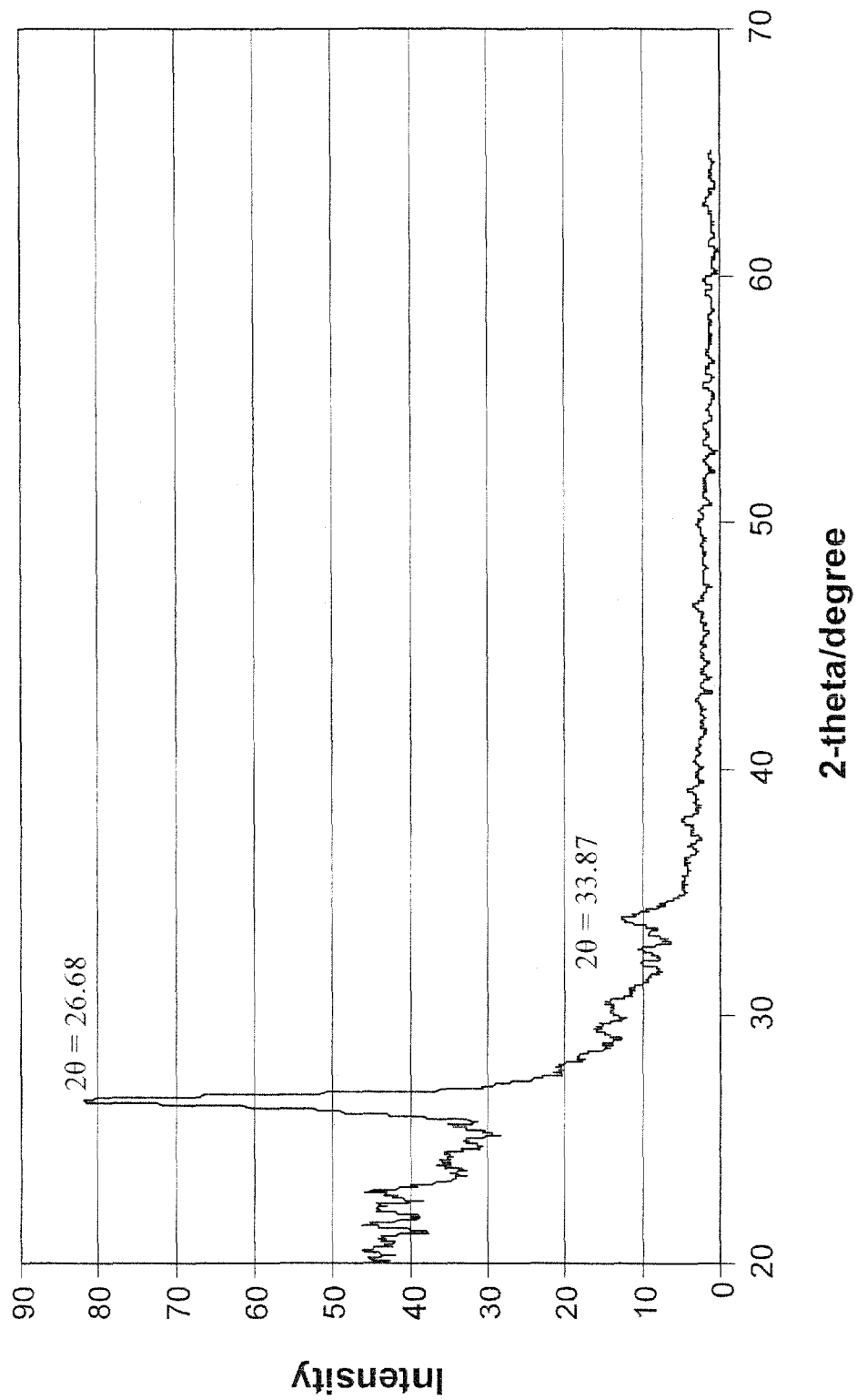
FIG. 8 is a an X-ray diffraction pattern of an exemplary $SnO_2$ coating applied to the air side of a solar float anti-reflection glass.

FIG. 8 depicts the X-ray diffraction pattern of an exemplary $SnO_2$ coating layer and confirms the presence of crystal $SnO_2$ in the anti-reflection thin film. The lattice constants a=b=0.334 nm as calculated from 2 theta (26.28°) differ from the data reported for a tetragonal rutile structure. The X-ray diffraction pattern of FIG. 8 does not show other peaks located higher than 2 theta, perhaps indicating the presence of imperfect crystalline $SnO_2$ nanoparticles in the anti-reflection thin film.

Salt Fog Test

Figure 9:
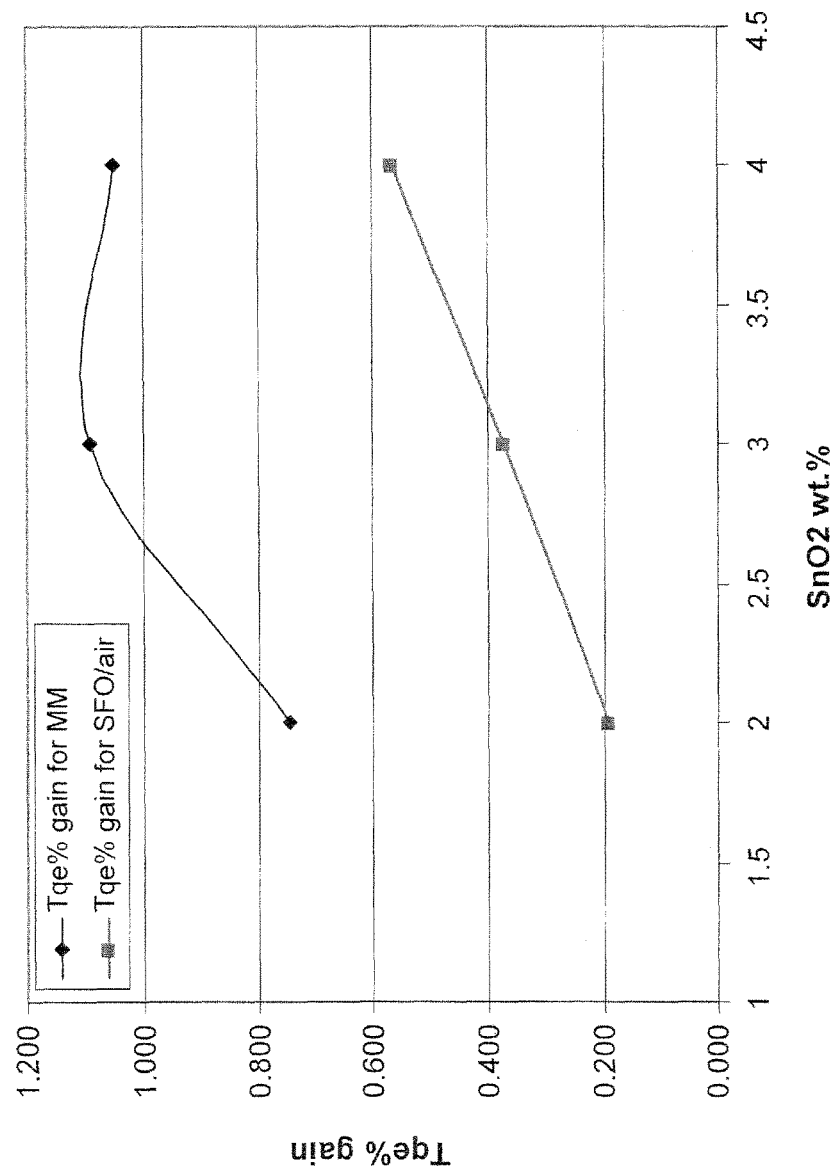
FIG. 9 is a graph illustrating the transmittance of solar float and matte/matte anti-reflection glasses coated with $SnO_2$ on the smooth side and $SiO_2$ (3%) on the rough side after a five day salt fog test.

Anti-reflection glasses having $SnO_2$ nanoparticles on solar float and matte/matte glass were evaluated after being subjected to a standard salt fog test, with the environment of the salt fog chamber used to test the glass samples based on the test criteria reported in the literature. Notably, the ΔTqe % for both the solar float and matte/matte glass increased (see FIG. 9). As reported above, that result differs from anti-reflection glasses made by $SiO_2$ particles in a colloidal solution where the ΔTqe % actually decreases with increasing test time in the salt fog chamber. Applicant believes that the decrease of ΔTqe % of anti-reflection glass made with $SiO_2$ nanoparticles can be attributed to the damage sustained by the anti-reflection thin film from NaOH in the salt fog chamber. In contrast to $SiO_2$, it appears that an additional $SnO_2$ crystal structure forms during a salt fog test, which has the unexpected benefit of improving both transparency and the chemical stability of the anti-reflection thin film.

It is known that several chemical reactions normally occur during a salt fog test. The first is an ion exchange between sodium ion and water which tends to generate sodium hydroxide (NaOH) and a silane group. The glass can also be hydrolyzed with water which forms additional silane groups. Although hydrolyzed glass with silane groups can be neutralized with NaOH, the attacking nature of NaOH to the glass occurs with $SiO_2$, damaging the glass.

Durability of Anti-Reflection Glass Coated with $SnO_7$ Nanoparticles

Various durability tests of anti-reflection glass samples coated with $SnO_2$ nanoparticles are summarized in Table 4 below.

TABLE 4

Durability of coated anti-reflection glass coated with SnO2 nanoparticles*

| ID | Tqe % before test | Tqe % after test | ΔTqe % |
|---|---|---|---|
| Water Boil (100 C.) | | | |
| 166-1C | 94.362 | 94.617 | 0.255 |
| 166-2C | 94.463 | 94.765 | 0.302 |
| NaOH (0.1N) | | | |
| 166-3C | 94.278 | 94.565 | 0.287 |
| 166-4C | 94.568 | 94.879 | 0.310 |
| Tape Pull | | | |
| 166-5C | 94.826 | 93.882 | −0.945 |
| 166-6C | 94.457 | 93.668 | −0.789 |
| Crockmeter | | | |
| 166-7C | 94.850 | 93.877 | −0.972 |
| 166-8C | 94.369 | 93.494 | −0.876 |

*First coating: matte/matte/rough side with 4 wt. % of SnO2 in n-propyl alcohol; second coating: matte/matte/smooth side with colloidal solution (3 wt. %).

An increase of ΔTqe % can be seen for anti-reflection glasses tested in a water boil and NaOH solution. The increase in ΔTqe % may be due in part to a change the thin film porosity as noted above. Anti-reflection glass samples tested by a tape pull and crockmeter tests in Table 4 show a decrease of the ΔTqe % (0.7-0.9%) on the side coated with $SnO_2$. The adhesion between $SnO_2$ nanoparticles and the glass surface may not be strong enough to resist an attack from an organic solvent (such as isopropyl alcohol) when used to clean residual tape using tissue paper. Almost the entire coating layer from the $SnO_2$ nanoparticles was also removed during the crockmeter test which shows a decrease of ΔTqe %.

As discussed above, it has been found that the mechanical strength of any $SnO_2$ thin film can be improved by including a binder in the colloidal solution by which a three dimension crosslinked network of $SnO_2$ can be developed.

In example embodiments of this invention discussed above, there is provided a method of forming a coated article comprising an anti-reflection coating on a glass substrate to increase transmittance, the method comprising: providing a colloidal solution comprising tin oxide based nanoparticles; depositing at least a portion of said colloidal solution comprising tin oxide based nanoparticles on a glass substrate to form a substantially uniform coating; curing said coating at least by heating said glass substrate and said coating.

In the method of the immediately preceding paragraph, the thickness of said coating may be from about 20 to 100 nm.

In the method of any of the preceding two paragraphs, the amount of increase in said glass transmittance may be about 2 to 6%, more preferably about 3.5%.

In the method of any of the preceding three paragraphs, said glass substrate may be a matte/matte glass.

In the method of any of the preceding four paragraphs, said glass substrate may be float glass.

In the method of any of the preceding five paragraphs, said colloidal solution may contain a binder comprising tetraethyl orthosilicate.

In the method of any of the preceding six paragraphs, said tin oxide based nanoparticles comprise $SnO_2$ nanoparticles.

In the method of any of the preceding seven paragraphs, the tin oxide nanoparticles may range in size from about 10 to 20 nm.

In the method of any of the preceding eight paragraphs, the weight percentage of said nanoparticles may be from about 2-5%.

In the method of any of the preceding nine paragraphs, said colloidal solution comprising tin oxide based nanoparticles may be applied directly to said glass substrate using a spin coating method.

In the method of any of the preceding ten paragraphs, said colloidal solution may be applied using spin coating to a roughened side of said glass substrate.

In the method of any of the preceding eleven paragraphs, the method may include applying a colloidal solution comprising silica to a smooth side of said glass substrate.

In the method of the preceding paragraph, the amount of said silica in said coating may be about 3% by wt.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of forming a coated article with an anti-reflection coating, the method comprising:
    forming a coating consisting essentially of silica particles and a binder directly on a first surface of a glass substrate; and
    forming a coating comprising tin oxide directly on a second surface of the glass substrate,
    wherein the glass substrate is disposed between the silica coating and the tin oxide coating.

2. The method according to claim 1, wherein forming the coating comprising tin oxide comprises
    depositing at least a portion of a colloidal solution comprising the tin oxide on a glass substrate; and
    curing the coating comprising tin oxide at least by heating said glass substrate and the coating comprising tin oxide.

3. The method according to claim 2, wherein said colloidal solution contains a binder comprising tetraethyl orthosilicate.

4. The method according to claim 2, wherein the weight percentage of said tin oxide in the colloidal solution is about 2-5%.

5. The method according to claim 2, wherein said colloidal solution comprising tin oxide is applied directly to said glass substrate using a spin coating method.

6. The method according to claim 5, wherein said colloidal solution is applied using spin coating to a roughened side of said glass substrate.

7. The method according to claim 1, wherein the thickness of the coating comprising tin oxide is between 20 and 100 nm.

8. The method according to claim 1, wherein a glass transmittance of the coated article is about 2% higher than a glass transmittance of a glass substrate without the coating comprising tin oxide, wherein the glass transmittance is defined as:

$$Tqe\% = \frac{\sum_{i=400}^{1200}(Tqe\%)_i}{\sum_{i=400}^{1200} N_i}.$$

9. The method according to claim 8, wherein the glass transmittance is about 3.5% higher.

10. The method according to claim 1, wherein said glass substrate is a matte/matte glass so that opposing major surfaces of the glass substrate are matte.

11. The method according to claim 1, wherein the coating comprising a silica is formed by applying a colloidal solution comprising silica to a smooth side of said glass substrate.

12. The method according to claim 11, wherein the amount of said silica in said coating is about 3% by wt.

13. The method according to claim 11, wherein said colloidal solution comprising silica contains a binder comprising tetraethyl orthosilicate.

14. The method according to claim 11, wherein the colloidal solution comprises silica nanoparticles.

15. The method of claim 1, wherein providing of the coating comprising tin oxide and the coating comprising silica increases transmittance of the coated article by at least 2% compared to if the coating comprising tin oxide and the coating comprising silica were not present.

16. The method according to claim 15, wherein the glass transmittance is about 3.5% higher.

17. The method according to claim 1, wherein the tin oxide comprises tin oxide nanoparticles.

18. The method according to claim 17, wherein the tin oxide nanoparticles range in size from about 10 to 20 nm.

19. A method of forming a coated article with an anti-reflection coating, the method comprising:
   forming a first coating containing a first coating layer comprising a silica on a first surface of a glass substrate; and
   forming a second coating containing a second coating layer comprising tin oxide on a second surface of the glass substrate,
   wherein the glass substrate is disposed between the first coating and the second coating, and
   wherein the second coating on the second surface of the glass substrate only includes the second coating layer, and wherein the first coating on the first surface of the glass substrate only includes the first coating layer.

* * * * *